June 3, 1924. 1,496,676
P. M. JAUVERT
REFRIGERATING PLANT WITH AUTOMATIC TEMPERATURE REGULATION
Filed March 31, 1924
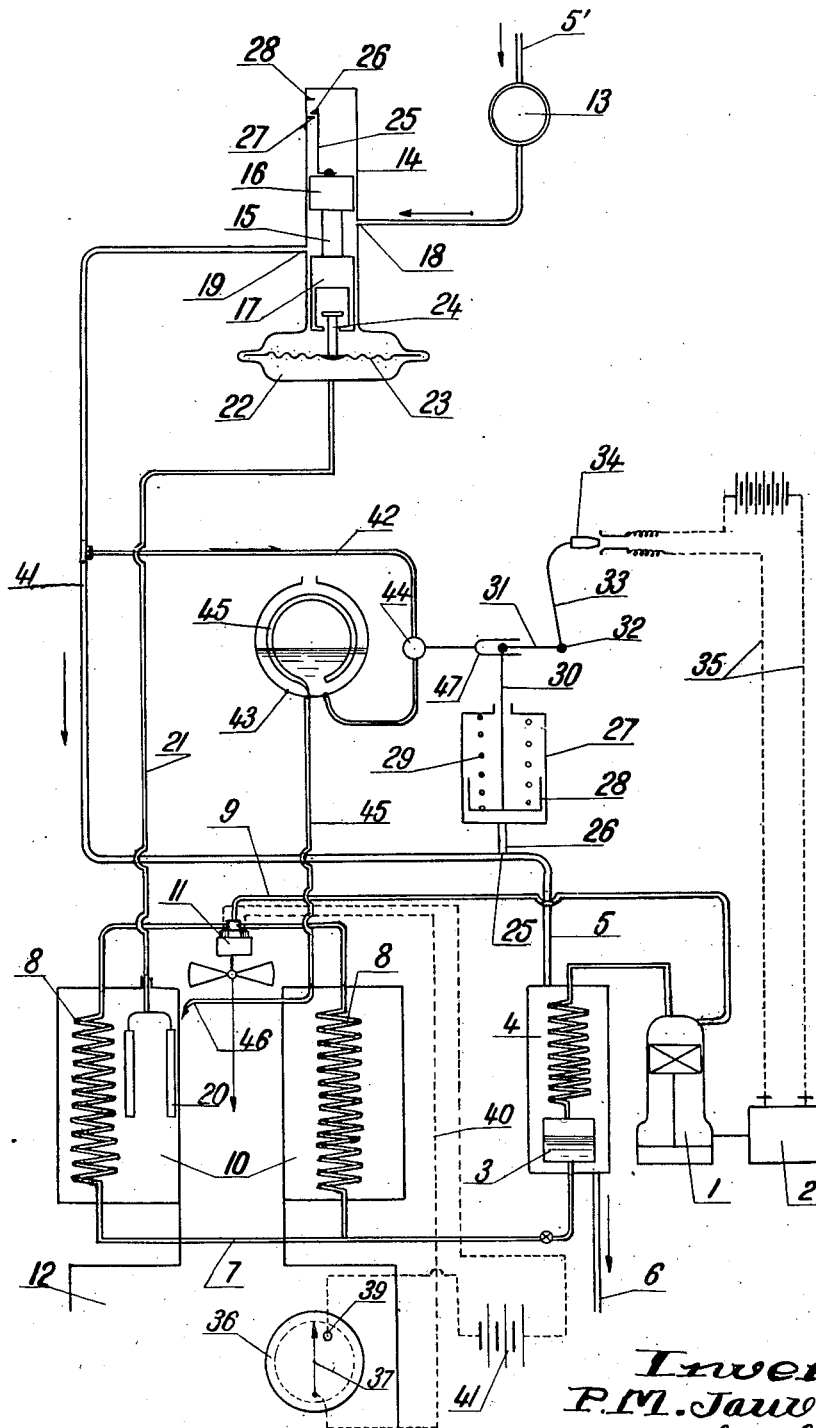
Inventor
P.M. Jauvert
By Marks & Clerk
Attys.

Patented June 3, 1924.

1,496,676

UNITED STATES PATENT OFFICE.

PIERRE MAURICE JAUVERT, OF TOULON, FRANCE.

REFRIGERATING PLANT WITH AUTOMATIC TEMPERATURE REGULATION.

Application filed March 31, 1924. Serial No. 703,242.

*To all whom it may concern:*

Be it known that I, PIERRE MAURICE JAUVERT, a citizen of the French Republic, residing at Toulon, France, have invented certain new and useful Improvements in Refrigerating Plants with Automatic Temperature Regulations, of which the following is a specification.

My invention relates to a combination of regulating means for the control of a refrigerating plant, whereby a substantially constant temperature may be maintained in the rooms or like spaces to be cooled, such spaces being designated hereinafter as "cold chamber."

A refrigerating plant of the known type comprises as a rule; a compressor for liquefiable gas, a condenser in which the compressed gas is cooled and liquefied by a water circulation, and an evaporating element supplied with the liquefied gas from the condenser, and in which the said gas is again vaporized due to the suction of the compressor, thus withdrawing the heat required for its evaporation from a fluid which when thus cooled is delivered to the cold chamber for refrigerating the same.

The combination of devices for the automatic regulation of the temperature of the cold chamber, according to my said invention, essentially comprises a temperature indicator disposed in the said chamber and effecting at the proper time, by a direct or an indirect control, the operation of a cut-off device which is mounted on the inlet of the circulation water supplying the condenser; the circulation water further controls—at a point situated between the said cut-off device and the remainder of the plant—an element serving to control the starting and stopping of the compressor.

The direct control as above mentioned may be obtained by means of a temperature indicator operating by an electric contact, thus controlling an electromagnet which actuates a valve mounted on the conduit of the condenser circulation water.

The indirect control as above mentioned may be obtained by the use of the following devices. The cold circulating fluid of the evaporating element consists of a congealable brine, and air is circulated by a suitable blower upon the walls of the vessel containing the said brine, the air thus cooled being delivered to the cold chamber. Into the said brine is immersed a test tube (or set of tubes) also containing the same brine, and communicating with a capsule containing an elastic diaphragm which is displaced by reason of the increase in volume of the brine contained in the said test tube when the same is frozen, and the diaphragm will thus control the valve which is mounted on the condenser water conduit. So that when the brine becomes frozen, the refrigerating machine is stopped, and the frozen brine will act for a certain time as a cold reserve or compensating element. The temperature indicator with electric contact which is disposed in the cold chamber serves to control the starting of the blower when the temperature of the cold chamber rises above a stated limit, or the stopping of said blower when the temperature falls below another stated limit.

The various improvements in detail, as hereinafter disclosed, likewise form part of my said invention.

The following description and appended drawings of a diagrammatic nature show by way of example a refrigerating plant comprising the said improvements.

In the said plant, a compressor 1 which is driven for instance by an electric motor 2 delivers liquefiable gas in the compressed state to a condenser 3 surrounded by a jacket 4 wherein water is circulated from the inlet piping 5 to the outlet 6. The compressed gas which is cooled by the said water circulation becomes liquified at 3 and flows thence through a conduit 7 into the evaporating element 8 whereof the upper end is connected by the piping 9 with the suction end of the compressor 1. The said evaporating element is immersed in a vessel 10 containing a congealable brine. A blower 11 supplies air to the walls of the cooled vessel 10, and this air flows in a cooled state into the cold chamber 12.

The following means are provided for the automatic regulation of the temperature of the above-mentioned plant.

At the outward end 5′ of the piping 5 supplying water to the condenser 3—upon which may be disposed in the known manner a recipient containing water under pressure or a pressure regulator 13—is mounted a cut-off device 14 for interrupting the water circulation, consisting of a slide valve 15 having a restricted portion situated between two parts of larger diameter 16, 17 whose spacing is less than the spacing between the water inlet 18 and outlet 19 of the cylinder 14. When both orifices 18 and 19 communicate with the annular chamber of valve, the circulation water of the condenser is allowed to flow, but this supply is interrupted when the valve rises in such manner as to close the lower orifice. The said valve is controlled in the following manner.

The bath of freezing brine 10 has disposed therein a test tube 20 containing the same brine and communicating through the pipe 21 with a capsule 22 which contains a diaphragm 23 provided with a rod 24 engaging—with longitudinal play—in a recess formed in the lower part of the said valve. Due to the change in volume of the said brine in the test tube 20, the conduit 21 and the chamber 22 which takes place when the brine is frozen, the said diaphragm will be displaced, drawing with it the said valve by means of the rod 24. At the upper part of the valve is disposed a spring strip 25 having at the top a stud 26 cooperating with the stop-pieces 27, 28 mounted upon the cylinder and corresponding to the opening or closing position of said valve. The longitudinal play between the rod 24 and the recess in the valve is such that the valve will not be displaced by reason of the gradual change in volume of the liquid due to its temperature variations, but only near the extreme points of congelation or liquefaction, while on the other hand the motion of the diaphragm will be continuous, according to the progress of the congelation.

Upon the conduit 5 of the circulation water of the condenser 3, and subsequent to the closing device 14, is disposed at 25 a branch pipe 26 connected with the bottom of the cylinder 27, below the piston 28 urged by a reaction spring 29. The rod 30 of said piston acts upon the short arm 31 of a bell-crank pivoted at 32 whose long arm 33 is provided with a contact piece forming part of an electric contact device 34 to which are connected the conductors 35 supplying the electric motor 2. When the piston 28 rises, the said contact device closes the circuit and the electric motor is operated; when the piston descends, the circuit is opened and the motor is stopped, so that the device serves in fact to stop the motor of the compressor when the pressure ceases in the piping 5, and chiefly when the supply of water to the compressor is cut off by the valve 15. But inasmuch as the motor is stopped irrespectively of the cause of the failure of pressure in the piping, this will provide a safety arrangement which comes into action should the water supply fail for any reason in the piping 5.

In the cold chamber 12 is disposed a thermometer of the dial type 36 whose flexible pointer 37 may when the temperature exceeds a given value come into contact with a stud 39, thus closing a circuit 40 comprising a source of current 41 and supplying the motor which drives the blower 11.

Upon the conduit 5, and subsequent to the closing device 14, is disposed at 41 a branch pipe 42 leading to the siphon-discharge vessel 43 (or flushing device), the same being provided with the cock 44. The inverted U-tube 45 of the said vessel, forming a siphon which is primed when the level of the liquid in the said vessel rises above the top of the tube, is connected with a conduit 45 providing for the flow of water at 46 upon the walls of the chamber 10 containing the freezing brine employed with the evaporating element 8. The cock 44 is controlled by a fork 47 coacting with the end of the rod 30 of the piston 28.

The operation of the said automatic arrangement is as follows:

The general object of the said combination is to maintain a constant value for the temperature of the cold chamber; the mean temperature chosen is the one for which the pointer 37 of the said thermometer comes into contact with the stud 39. When the plant as a whole is in operation, the contact device 14 is open; the condenser circulation water entering through the conduit 5 exercises pressure through the pipe 26 below the piston 28, and the latter is raised; the contact device 34 is thus closed, and the motor 2 is supplied with current. The open position of the valve 15 corresponds to a temperature of the brine 10 for which the same is not frozen, nor is the liquid in the test tube 20 frozen, for the same reason. Due to the operation of the refrigerating combination 1—3—8, the brine 10 becomes cooled to the freezing point.

The brine of like nature in the test tube 20 will also become frozen, and due to its expansion it will act upon the diaphragm 23, thereby closing the valve 13 which cuts off the supply of condenser circulation water to the conduit 5. Under the action of the spring 29, the piston 28 descends to the bottom of the cylinder and opens the circuit by means of the contact device 34, so that the motor 2 and compressor 1 will be stopped. When the temperature in the cold chamber 12 rises above the stated limit, the pointer 37 comes into contact with the stud 39; the blower 11 is thus started, and it supplies the cold chamber 12 with air which is cooled by its contact with the walls of the chamber 10 containing the frozen brine. When the temperature of the cold chamber 11 becomes lowered, the pointer 37 will break the circuit at the contact stud 39, so that the blower will be stopped; but it will again operate when the temperature rises, and so on during the whole time in which the brine 10 remains frozen. The brine thus constitutes a cold reserve or compensating element whereby the temperature of the cold chamber 12 can be maintained constant for a certain time, even though the refrigerating machine should be stopped. The movement of the piston 28 will open the cock 44 and the siphon vessel 43 is operated, thus discharging upon the walls of the chamber 10 a strong flush of water which removes all frost which may have formed thereon. So that the current of air produced by the blower 11 will be in close contact with the walls of the recipient 10 and thus becomes cooled to the maximum.

When the brine 10 returns to the liquid state after a certain number of successive operations of the blower 11, the brine in the test tube 20 will also become liquid and due to its diminution in volume, the diaphragm 23 and the valve 15 will descend, thereby opening the feed inlet to the conduit 5; the circulation water again flows into the condenser 3, the piston 28 rises and closes the electric circuit by means of the contact device 34, and the motor 2 and compressor 1 are put in operation.

Without departing from the spirit of the invention, the said plant is susceptible of a wide range of modifications, among which the following may be mentioned.

The control of the starting and stopping of the compressor 1 by the piston 28 may be adapted to all compressors with electric or other drive, and all suitable means for starting and stopping the said compressors can be employed. For instance if the electric motor 2 requires a starting rheostat, the lever of said rheostat may be controlled directly by the rod 30; in this event the ascent of the piston 28 is made gradual, corresponding to the motor starting, while the descent corresponding to the breaking of the circuit will remain abrupt; this result can be readily obtained for example by mounting on the condut 26 a suitable valve, not shown, having a small orifice which is closed when the pressure is established in the conduit 3 and is opened when the pressure falls.

The control of the starting and stopping of the said compressor may also be effected by an element analogous to the device formed by the test tube set 20 and the capsule 22 containing the diaphragm 23, which is substituted for the piston 28. In this event the same control may actuate the valve device 14 cutting off the condenser circulation water.

But should it not be desired to effect the automatic control of the starting and stopping of the compressor by the temperature of the selected part of the refrigerating plant, I may simply make use of one of the above-mentioned controls in order to operate a signal device, for instance an electric bell, so as to indicate to the personnel the proper time for stopping the compressor or for again starting the same.

The test tube set 20 containing the said brine which is immersed in the bath of like brine 10 is preferably constituted, as herein represented, by a pair of tubes whereof one is adjacent the wall of the evaporating element 8 on which the brine becomes cooled by contact with the refrigerating fluid subjected to evaporation, and the other is adjacent the outer wall on which the brine is heated by contact with the fluid in circulation for cooling purposes. In this manner the diaphragm 23 is made responsive to the mean temperature of the volume of brine 10.

What I claim is:

1. In a refrigerating plant, a compressor for the compression of a liquefiable refrigerating fluid, a condenser, a conduit connected with the condenser for supplying a cooling fluid thereto, an evaporating element, a vessel containing said evaporating element, a control device for the starting and stopping of said compressor, a pressure operated element connected with said conduit supplying the cooling fluid to the condenser and acting upon said compressor controlling device, a cut-off device mounted on said conduit, a thermostat controlled by said evaporating element and actuating said cut-off device, a second vessel connected with and adapted to receive cooling fluid from said conduit, and a discharge conduit for the cooling fluid connected with the second mentioned vessel and having an outlet end arranged to direct a stream of cooling fluid over the outer surface of the first mentioned vessel.

2. In a refrigerating plant, a compressor for the compression of a liquefiable refrigerating fluid, a condenser, a conduit connected with the condenser for supplying a cooling fluid thereto, an evaporating element, a vessel containing said evaporating element, a control device for the starting and stopping of said compressor, a pressure operated element connected with said conduit supplying the cooling fluid to the condenser and acting upon said compresser controlling device, a cut-off device mounted on said conduit, a thermostat controlled by said evaporating element and actuating said cut-off device, a second vessel connected with and adapted to receive cooling fluid from said conduit, a discharge conduit for the cooling fluid connected with the second mentioned vessel and having an outlet end arranged to direct a stream of cooling fluid over the outer surface of the first mentioned vessel, and means actuated by said pressure operated element controlling the admission of cooling fluid to the second mentioned vessel.

3. A refrigerating plant as claimed in claim 1 characterized by the provision of a siphon tube arranged in the second vessel, connected with said discharge conduit and adapted to be primed during the rising of the level of liquid in the second mentioned vessel.

4. A refrigerating plant as claimed in claim 2 characterized by the provision of a siphon tube arranged in the second vessel, connected with said discharge conduit and adapted to be primed during the rising of the level of liquid in the second mentioned vessel.

In witness whereof I have hereunto set my hand in the presence of two witnesses.

PIERRE MAURICE JAUVERT.

Witnesses:
  Sig. Boulet,
  Allan Macfarlane.